United States Patent [19]

Odawara et al.

[11] Patent Number: 4,827,468
[45] Date of Patent: May 2, 1989

[54] INFORMATION MEMORY MEDIUM

[75] Inventors: Kazuharu Odawara, Yokohama; Ryoji Yamaguchi, Yutaka; Nobuo Inage, Tokyo, all of Japan

[73] Assignee: Kabushiki Kaisha Toshiba, Kawasaki, Japan

[21] Appl. No.: 63,486

[22] Filed: Jun. 18, 1987

[30] Foreign Application Priority Data

Sep. 30, 1986 [JP] Japan .............................. 61-14886[U]
Nov. 12, 1986 [JP] Japan ............................ 61-172695[U]

[51] Int. Cl.$^4$ ......................... G11B 7/00; G11B 23/40
[52] U.S. Cl. .................................... 369/271; 360/133; 360/135; 369/272; 369/290
[58] Field of Search ............... 369/270, 271, 273, 284, 369/286, 272, 282, 290; 360/133, 135

[56] References Cited

U.S. PATENT DOCUMENTS

| | | | |
|---|---|---|---|
| 1,331,857 | 2/1920 | Walthers | 369/272 |
| 2,528,611 | 11/1950 | Saffady | 369/286 |
| 2,536,922 | 1/1951 | Durbrow | 369/290 |
| 3,689,078 | 9/1972 | Ban | 369/286 |
| 3,730,618 | 5/1973 | Dimitracopoulos | 369/273 |
| 3,801,476 | 4/1974 | Roschmann et al. | 369/282 |
| 4,587,647 | 5/1986 | Mak et al. | 369/270 |
| 4,658,393 | 4/1987 | Ohta et al. | 369/284 |

Primary Examiner—Steven L. Stephan
Attorney, Agent, or Firm—Oblon, Fisher, Spivak, McClelland & Maier

[57] ABSTRACT

An information memory medium adapted for processing information with a drive mechanism including a turntable which has a support surface and a magnetic attraction member. The information memory medium includes a disk-shaped body, and an attractable member and a label disposed on the body. The label represents a manufacturer, recording sides, and type of the disk, etc., and is located on a portion of the body other than the surface where the attractable member is disposed and other than where the support surface comes in contact with the body.

9 Claims, 3 Drawing Sheets

INFORMATION MEMORY MEDIUM

BACKGROUND OF THE INVENTION

1. Field of the Invention

The present invention relates to an information memory medium, and more particularly to an optical recording disk used for an information processing apparatus for recording, reproducing or erasing image information.

2. Discussion of Background

Recently, information processing apparata having used as an information memory medium an optical recording disk for recording or reproducing image information.

In the information processing apparatus of this type, the optical recording disk is mounted on a turntable and rotated so that the apparatus may perform information processing, such as recording or reproduction, on or from the optical recording disk. In order to support the optical recording disk on the turntable in the information processing apparatus, the optical recording disk is magnetically attracted by a magnetic attraction member provided on the turntable. The magnetic attraction member attracts an attractable member which is disposed on a central portion of the outside surface of the optical recording disk. The optical recording disk has a label denoting the manufacturer, recording sides, such as sides A and B, and the type of the disk. Also, the label is attached to the outside surface of the central portion of the substrate. Generally, a layer of an adhesive agent used to bond the label to the substrate does not have an uniform thickness along its surface. Also, the thickness of the label is itself not uniform. Therefore, the optical recording disk, provided with the attractable member installed on the label on the substrate, does not present a uniform attraction force to the attractable member. Consequently, the optical recording disk may not be mounted on the turntable stably, so that information may not be correctly recorded or reproduced.

In the above-described arrangement of the attractable member and the turntable, it is very difficult to prevent the optical recording disk from vibrating because the attractable member and the substrate do not have accurately parallel surfaces facing each other. The apparatus, therefore, is arranged such that the substrate of the optical recording disk is adapted to oppose the surface of the turntable. However, if the label, which is attached to the central portion of the outside surface of the substrate, is in directd contact with the surface of the turntable, the optical recording disk is slightly vibrated. Therefore, information may not be correctly recorded or reproduced on or form the optical recording disk.

SUMMARY OF THE INVENTION

Accordingly, it is an object of the present invention to provide a new and improved information memory medium having a label, which may be mounted securely on a turntable.

It is an another object of the present invention to provide an information memory medium having a label, wherein information may be stably and reliably recorded or reproduced.

It is a still another object of the present invention to provide an apparatus in which an information memory medium having a label may be supported securely on a turntable.

In accordance with the present invention, the foregoing objects are achieved by providing an information memory medium, adapted for processing information with a drive mechanism including a turntable having a support surface for supporting the information memory and a magnetic attraction member for magnetically attracting the information memory medium toward the turntable, which information memory medium includes a disk-shaped body having a recording layer for storing information; an attractable member disposed on the body at a central portion of the body, wherein the attractable member is attracted by the magnetic attraction member toward the turntable; and a label representing, e.g., a manufacturer of the information memory medium, wherein the label is located on a portion of the body other than the surface where the attractable member is disposed and other than where the support surface comes in contact with the body.

In accordance with another aspect of the present invention, the above-stated objects are achieved by providing an information memory medium, adapted for processing information with a drive mechanism having a turntable for rotating the information memory medium and a magnetic attraction member for magnetically attracting the information memory medium, which includes a disk-shaped body having a recording layer for storing the information; an attractable member disposed on the body at a central portion of the body, the attractable member being attracted by the magnetic attraction member toward the turntable; and a label representing a manufacturer of the information memory medium, wherein the label is located on a portion of the body other than the surface where the attractable member is disposed.

In accordance with yet another aspect of the present invention, there has also been provided an apparatus for rotatably supporting an information memory medium having a disk-shaped body, an attractable member formed on a central portion at the body and projecting from the body, and a label located on a portion of the body other than the surface where the attractable member is disposed, which includes means for rotating the information memory medium, the rotating means have a supporting surface for supporting the information memory medium thereon; and means provided on the rotating means for magnetically attracting the attractable member of the information memory medium toward the rotating means, wherein the supporting surface comes in contact with the surface of the body, but is out of contact with the attractable member and the label of the information memory medium.

BRIEF DESCRIPTION OF THE DRAWINGS

A more complete appreciation of the present invention and many of its attendant advantages will be readily obtained as the same becomes better understood by reference to the following detailed description when considered in connection with the accompanying drawing, wherein.

DETAILED DESCRIPTION OF THE PREFERRED EMBODIMENTS

Figure 1:
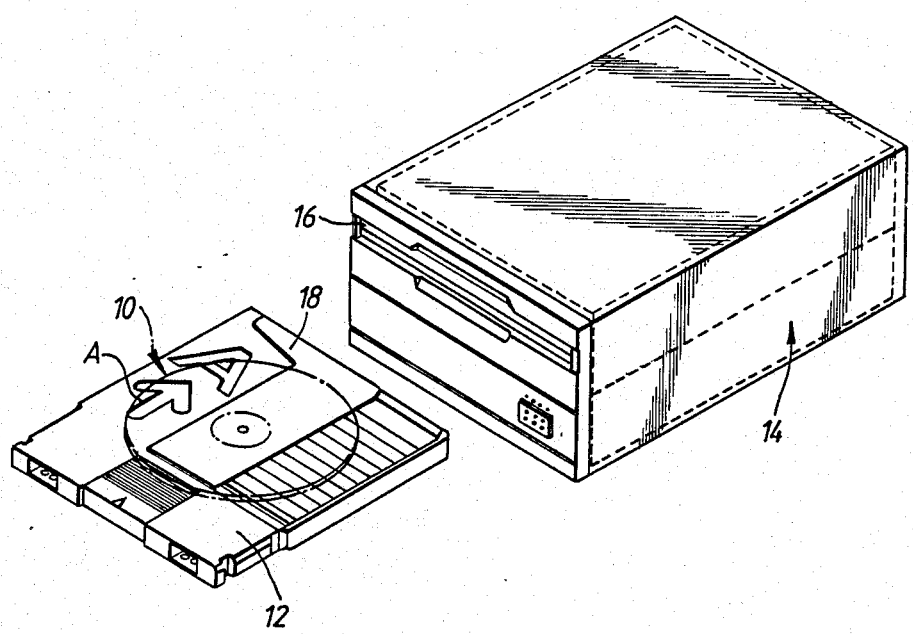
FIG. 1 is a perspective view showing the outer appearance of an information memory medium and an information processing apparatus of the present invention.

Referring now to the drawings, wherein like reference numerals designate identical or corresponding parts throughout the several views, and more particularly to FIG. 1 thereof, an information memory medium such as optical recording disk is generally designated 10. Optical recording disk 10 is used for recording or reproducing information, and is accomodated in a cartridge 12.

Figure 2:
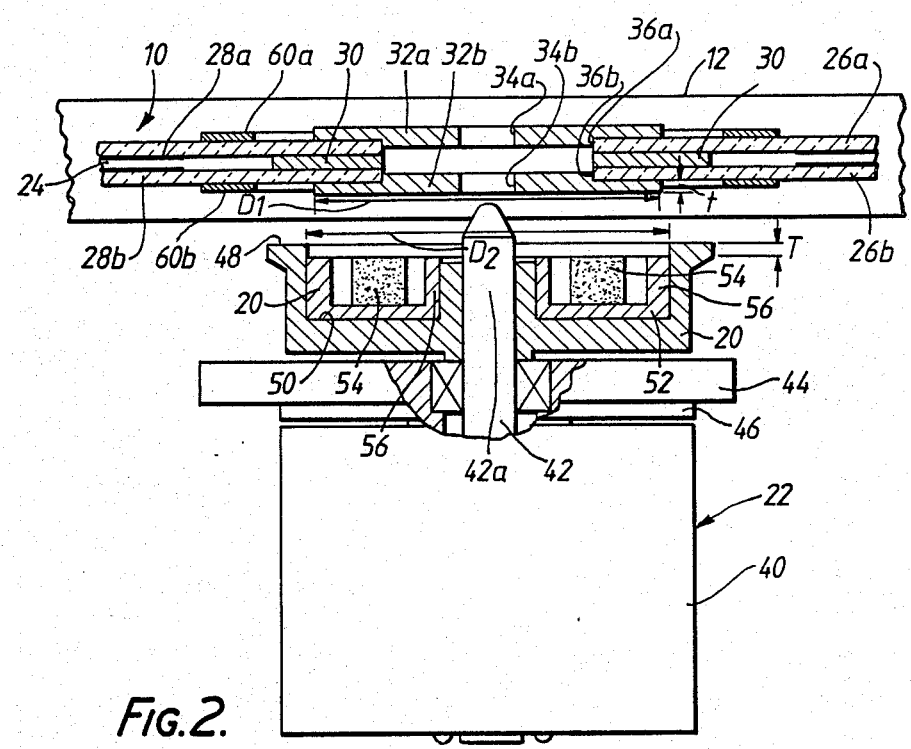
FIG. 2 is a side view, partially in cross-section, of the apparatus with the information memory medium according to the present invention.
Figure 3:
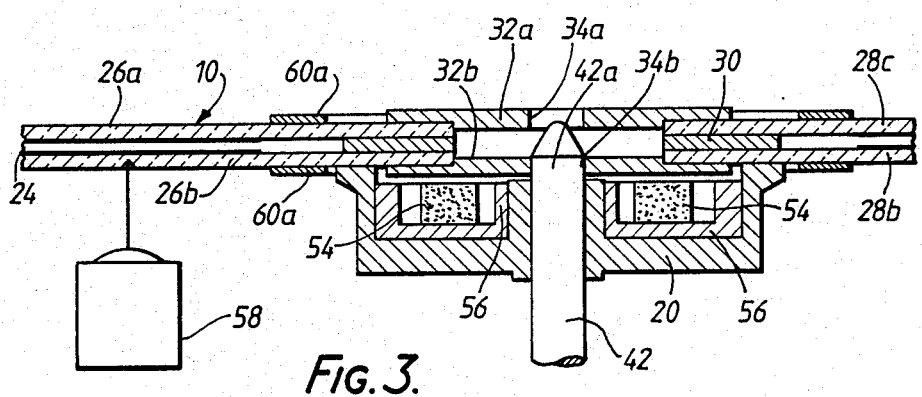
FIG. 3 is a side view, partially in cross-section, of the apparatus with the information memory medium on the drive mechanism according to the present invention.

As shown in FIG. 1, a cartridge 12 including optical recording disk 10 is adapted to be inserted into an information processing apparatus 14 through a medium slot 16 thereof. Optical recording disk 10 is automatically introduced into apparatus 14 in the direction of an arrow A shown in FIG. 1, by a medium guiding/loading mechanism (not shown). During this operation, a shutter 18 provided on cartridge 12 is opened so as to expose the center portion of optical recording disk 10. As shown in FIGS. 2 and 3, thereafter, optical recording disk 10 is automatically mounted on a turntable 20 located in a drive mechanism 22 for rotating optical recording disk 10.

A body 24 of optical recording disk 10 has two disk-shaped substrates 26a and 26b, and recording layers 28a and 28b. Substrates 26a and 26b are formed from glass or optically transparent plastic materials, such as acrylic resin, polycarbonate, and the like. Also, substrates 26a and 26b take the form of a disk having an internal diameter of about 15 mm, an external diameter of about 130 mm and a thickness of about 1.2 mm. The two substrates 26a and 26b are held together through an inner spacer 30 and an outer spacer (not shown). Recording layers 28a and 28b including Te are deposited on inner surfaces of substrates 26a and 26b, respectively. Information is recorded in the form of pits on recording layers 28a and 28b.

Also, optical recording disk 10 is provided with attractable members 32a and 32b at the central portions of the respective outer surfaces of substrates 26a and 26b. Attractable members 32a and 32b are formed disk-shaped from a metal plate, such as Cr stainless steel, and have central holes 34a and 34b in the central portions. Also, attractable members 32a and 32b have ring-shaped projections 36a and 36b coaxial with center holes 34a and 34b, respectively. Projections 36a and 36b are fitted to substrates 26a and 26b, so that attractable members 32a and 32b are fixedly bonded to the outer surfaces of substrates 26a and 26b, respectively, by means of a bonding agent, such as epoxy resin.

On the other hand, drive mechanism 22 for rotating optical recording disk 10 has a DC motor 40 for a drive source, a turntable 20 mounted on a rotating shaft 42 of motor 40, a frame 44 for supporting motor 40, and a control board 46 for controlling the operation of motor 40.

Turntable 20 is formed of nonmagnetic metal and has a support surface 48 perpendicular to shaft 42. Also, turntable 20 is formed with a circular depression 50. Depression 50 is coaxial with shaft 42, and exposed to the support surface 48. Depression 50 has a magnetic attraction member 52 including a ring-shaped yoke 54 and a magnet 56. Magnetic attraction member 52 magnetically attracts attractable members 32a and 32b provided on optical recording disk 10. Thus, housed in depression 50, magnetic attraction member 52 may fully exhibit its attraction force for mounting optical recording disk 10 on turntable 20.

Also, diameter $D_2$ of depression 50 is greater than diameter $D_1$ of attractable members 32a and 32b provided on optical recording disk 10. The distance between top faces of yoke 54 and magnet 56, and support surface 48 of turntable 20 is defined as a reference distance T. Distance T is greater than a height t of the projection of attractable members 32a and 32b provided on optical recording disk 10. Body 24 of optical recording disk 10, therefore, is mounted so as to keep direct contact with support surface 48 of turntable 20 when attractable member 26b, for example, is attracted by magnet 56 of magnetic attraction member 52.

Rotating shaft 42 of motor 40 has a positioning portion 42a to support, rotate, and locate optical recording disk 10. Positioning portion 42a engages with center hole 34b of lower attractable member 32b when the optical recording disk 10 is mounted on the turntable 20.

As shown in FIG. 3, an optical head 58 is located opposite the undersurface of optical recording disk 10 which is rotated by drive mechanism 22. Optical head 58 is moved by a linear motor (not shown) in the radial direction of optical recording disk 10. Optical head 58 has a semiconductor laser, an objective lens, a photodetector, and so forth, to perform information processing, such as recording or reproducing, on or from a recording layer 28b formed on underside substrate 26b of optical recording disk 10.

Figure 4:
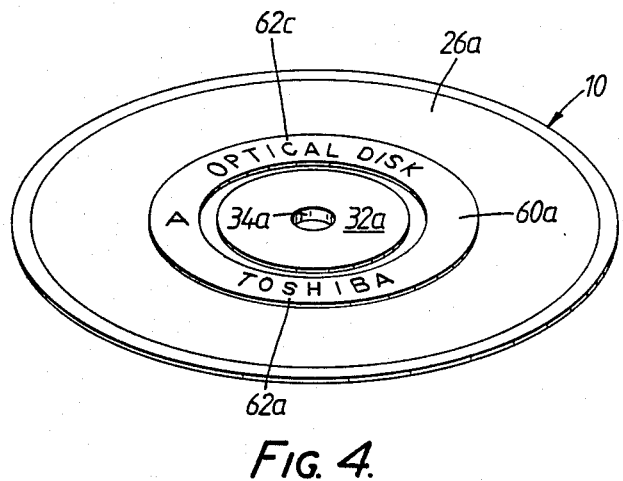
FIG. 4 is an perspective view of the information memory medium of the present invention.

As shown in FIGS. 2, 3 and 4, optical recording disk 10 has ringed labels 60a and 60b attached to outer surfaces of substrates 26a and 26b thereof. Labels 60a and 60b designate a manufacturer 62a, recording sides 62b (sides A and B), and a type of disk 62c. Labels 60a and 60b are formed from paper, plastic, metal foil, and the like, and have an inner diameter larger than an outer diameter of each of attractable members 32a and 32b, and an outer diameter shorter than an inner diameter of each of recording layers 28a and 28b. Moreover, the inner diameter of labels 60a and 60b is larger than an outer diameter of support surface 48 of turntable 20. Therefore, labels 60a and 60b are attached to a portion of body 24 other than surfaces where attractable members 32a and 32b are disposed and support surface 48 comes in contact with body 24 of optical recording disk 10.

The arrangement of optical recording disk 10 having labels 60a and 60b does not prevent body 24 from coming in direct contact with support surface 48 of turntable 20. Also, labels 60a and 60b are attached to the outside surfaces on which attractable members 32a and 32b attracted by magnetic attraction member 52 accommodated in turntable 20 are installed. Thus, attractable members 32a and 32b may be fitted securely to substrates 26a and 26b to produce a uniform attraction force between attractable members 32a and 32b and magnetic attraction member 52. Therefore, body 24 of optical recording disk 10, with recording layer 28a and 28b thereon, is held securely against turntable 20, so that vibration of body 24 perpendicular to its surface may be minimized. Accordingly, information may be recorded or reproduced reliably and stably.

It is to be understood that the present invention is not limited to the embodiment described above, and that various changes and modifications may be effected therein by one skilled in the art without departing from the scope or spirit of the invention.

Figure 5:
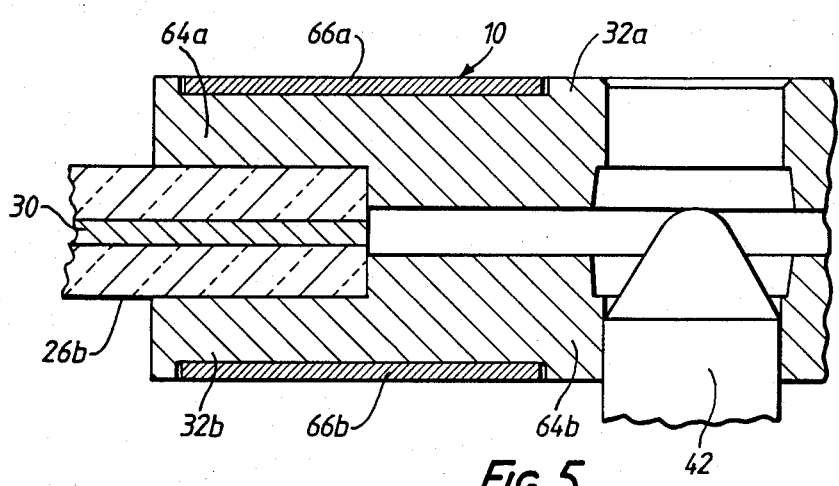
FIG. 5 is a side view, partially in cross-section, of an information memory medium according to the present invention.

As shown in FIG. 5, another embodiment will be described. Attractable members 32a and 32b provided on optical recording disk 10 have centering members 64a and 64b and magnetic members 66a and 66b. Centering members 64a and 64b are formed of a material whose coefficient of thermal expansion resembles that of substrates 26a and 26b. Magnetic members 66a and 66b are formed of a metal plate and are attached to centering members 64a and 64b so as to slightly move in the direction parallel to surfaces of substrates 26a and 26b. Therefore, even if optical recording disk 10 is subjected to any thermal effect such as a change of ambient temperature, the mobility of magnetic members 66a and 66b may absorb the difference in the degree of thermal expansion between magnetic members 64a and 64b, and the combination of substrates 26a and 26b and centering memebers 62a and 62b, attributable to their different coefficients of thermal expansion. Thus, information may be processed reliably and stably without causing any distortion in substrates 26a and 26b of optical recording disk 10.

In the embodiments described above, an optical recording disk with two substrates each a having recording layer is used for the information memory medium. Alternatively, however, the information memory medium may be provided with, e,g., a so called single-side recording type disk that has a recording layer on only one side of the disk, and a disk whose both substrate surfaces are bonded without an intervening spacer. Further, magnetic attraction members may be formed only of a magnet.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An information memory medium adapted for processing information with a drive mechanism having a turntable for rotating said information memory medium and a magnetic attraction member for magnetically attracting said information memory medium toward the turntable, the turntable having a support surface for supporting said information memory medium thereon, said information memory medium comprising:
   a disk-shaped body having a recording layer for storing information;
   an attractable member projected from a surface of said body at a central portion of said body so as to be attracted by the magnetic attraction means, wherein said disk-shaped body has a surface adapted to come into contact with the support surface of said turntable while being out of contact with the magnetic attraction member; and
   a label having predetermined information located on a portion of said body facing said turntable other than the surface where said attractable member is disposed and other than where the support surface comes in contact with said body.

2. An information memory medium as claimed in claim 1, wherein said label comprises an annular sheet.

3. An information memory medium as claimed in claim 1, wherein said attractable member comprises a disk-shaped member having a center hole.

4. An information memory medium as claimed in claim 3, wherein said attractable member has an outer diameter shorter than an inner diameter of the support surface of the turntable.

5. An information memory medium as claimed in claim 2, wherein said label has an inner diameter larger than an outer diameter of said attractable member and the support surface of the turntable.

6. An apparatus adapted for rotatably supporting an information memory medium having a disk-shaped body, an attractable member projected from a surface of the body at a central portion of the body, and a label located on a portion of the body facing said apparatus other than the surface where the attractable member is disposed, said apparatus comprising:
   means for rotating the information memory medium, said rotating means having a support surface for supporting the information memory medium thereon; and
   means provided on said rotating means for magnetically attracting the attractable member of the information memory medium toward said rotating means, wherein said support surface is adapted to come in direct contact with the surface of the body, while being out of contact with both the attractable member and the label of the information memory medium.

7. An information memory medium for use in association with an apparatus having a magnetic attraction means adapted to attract said information memory medium magnetically, supporting means adapted to support said information memory medium attracted by the magnetic attraction means and housing means for housing the attraction means therein, said information memory medium comprising:
   a disk-shaped body having a recording layer for storing information;
   an attractable member projected from a surface of said body at a central portion of said body, said attractable member adapted to be attracted by the magnetic attraction means and adapted to be housed in the housing means; and
   a label having predetermined information located on a portion of said body facing said supporting means other than the surface where said attractable member is disposed and other than another surface of said body where the supporting means is adapted to come in contact with said body, whereby the supporting means is adapted to support said disk-shaped body directly by means of said another surface.

8. An apparatus for rotatably supporting an information memory medium having a disk-shaped body, an attractable member projected from a surface of the body at a central portion of the body, and a label located on a portion of the body facing said apparatus other than the surface where the attractable member is disposed, said apparatus comprising:
   means for magnetically attracting the attractable member of the information memory medium; and
   means for supporting the information memory medium magnetically attracted by said attracting means, said supporting means having a supporting surface for directly supporting the disk-shaped body of the information memory medium, wherein said supporting means is out of contact with the label of the information memory medium.

9. An information memory medium adapted for processing information in association with magnetic attraction means for magnetically attracting said information memory medium and rotating means for rotating said information memory medium attracted by the magnetic attraction means, said rotating means having an annular support surface for supporting said information memory medium thereon, said information memory medium comprising:

a disk-shaped body having a recording layer for storing information;

an attractable member projected from a surface of said body at a central portion of said body so as to be attracted by the magnetic attraction means, said attractable member including a disk-shaped member having an outer diameter shorter than the inner diameter of the annular support surface; and a label having predetermined information located on a portion of said body facing said annular support surface, said label comprising an annular sheet having an inner diameter larger than the outer diameter of said attractable member and the support surface, wherein the annular support surface directly supports said disk-shaped body at a surface other than said portion of said body having said label and other than said surface from which said attractable member is projected.

* * * * *

UNITED STATES PATENT AND TRADEMARK OFFICE
CERTIFICATE OF CORRECTION

PATENT NO. : 4,827,468
DATED : May 02, 1989
INVENTOR(S) : Kazuharu ODAWARE, et al It is certified that error appears in the above-identified patent and that said Letters Patent is hereby corrected as shown below:

On the title page, item [30], the first priority number is incorrect, it should read as follows:

--Sep. 30, 1986 [JP]  Japan .............. 61-148866[U]
  Nov. 12, 1986 [JP]  Japan .............. 61-172695[U]--

Signed and Sealed this

Thirteenth Day of March, 1990

Attest:

JEFFREY M. SAMUELS

*Attesting Officer*      *Acting Commissioner of Patents and Trademarks*